United States Patent
Holden et al.

(10) Patent No.: US 6,332,478 B1
(45) Date of Patent: Dec. 25, 2001

(54) REUSABLE PIPE FLANGE COVERS

(75) Inventors: James Elliott Holden, Simpsonville, SC (US); Julieta Perez, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/606,938

(22) Filed: Jun. 29, 2000

(51) Int. Cl.[7] .................................................. F16L 57/00
(52) U.S. Cl. ......................................... 138/96 R; 138/109
(58) Field of Search .................. 138/96 R, 96 T, 138/109, 89

(56) References Cited

U.S. PATENT DOCUMENTS

| | | | |
|---|---|---|---|
| 2,708,950 | * 5/1955 | Averett | 138/96 R |
| 2,942,625 | * 6/1960 | Costanzo | 138/96 R |
| 3,327,379 | * 6/1967 | Clements | 138/96 R X |
| 3,587,654 | * 6/1971 | Yocum | 138/96 |
| 3,856,050 | 12/1974 | Rooney | 138/96 R |
| 3,942,681 | 3/1976 | Richardson | 138/96 R |
| 3,991,446 | 11/1976 | Mooney et al. | 138/108 X |
| 4,014,368 | 3/1977 | Nelsen | 139/109 |
| 4,112,979 | * 9/1978 | Widdicombe | 138/96 R X |
| 4,168,726 | * 9/1979 | Klennert | 138/96 R |
| 4,423,753 | 1/1984 | Smith et al. | 138/87 |

(List continued on next page.)

FOREIGN PATENT DOCUMENTS

1385167 * 2/1975 (GB) ................... 138/96 R

OTHER PUBLICATIONS

"39th GE Turbine State–of–the–Art Technology Seminar", Tab 1, F Technology –the First Half–Million Operating Hours, H.E. Miller,.

"39th GE Turbine State–of–the–Art Technology Seminar", Tab 2, GE Heavy–Duty Gas Turbine Performance Characteristics, F. J. Brooks.

"39th GE Turbine State–of–the–Art Technology Seminar", Tab 3, 9EC 50Hz 170–MW Class Gas Turbine, A. S. Arrao,.

"39th GE Turbine State–of–the–Art Technology Seminar", Tab 4, MWS6001FA –An Advanced–Technology 70–MW Class 50/60 Hz Gas Turbine, Ramachandran et al.

"39th GE Turbine State–of–the–Art Technology Seminar", Tab 5, Turbomachinery Technology Advances at Nuovo Pignone, Benvenuti et al.

"39th GE Turbine State–of–the–Art Technology Seminar", Tab 6, GE Aeroderivative Gas Turbines –Design and Operating Features, M. W. Horner.

"39th GE Turbine State–of–the–Art Technology Seminar", Tab 7, Advance Gas Turbine Materials and Coatings, P.W. Schilke,.

"39th GE Turbine State–of–the–Art Technology Seminar", Tab 8, Dry Low $NO_x$ Combustion Systems for GE Heavy–Duty Turbines, L. B. Davis.

(List continued on next page.)

Primary Examiner—Patrick Brinson
(74) Attorney, Agent, or Firm—Nixon & Vanderhye P.C.

(57) ABSTRACT

A molded, flexible pipe flange cover for temporarily covering a pipe flange and a pipe opening includes a substantially round center portion having a peripheral skirt portion depending from the center portion, the center portion adapted to engage a front side of the pipe flange and to seal the pipe opening. The peripheral skirt portion is formed to include a plurality of circumferentially spaced tabs, wherein free ends of the flexible tabs are formed with respective through passages adapted to receive a drawstring for pulling the tabs together on a back side of the pipe flange.

10 Claims, 3 Drawing Sheets

U.S. PATENT DOCUMENTS

| | | | |
|---|---|---|---|
| 4,915,137 | 4/1990 | Hall et al. | 138/96 R |
| 5,048,571 | 9/1991 | Ellis | 138/96 R |
| 5,265,752 | 11/1993 | Olson | 138/89 |
| 5,915,899 | * 6/1999 | Denis | 138/96 R X |
| 6,032,697 | * 3/2000 | Kennedy | 138/96 R |
| 6,102,076 | * 8/2000 | Romero, Jr. et al. | 138/96 R |

OTHER PUBLICATIONS

"39th GE Turbine State–of–the–Art Technology Seminar", Tab 9, GE Gas Turbine Combustion Flexibility, M. A. Davi,.

"39th GE Turbine State–of–the–Art Technology Seminar", Tab 10, Gas Fuel Clean–Up System Design Considerations for GE Heavy–Duty Gas Turbines, C. Wilkes.

"39th GE Turbine State–of–the–Art Technology Seminar", Tab 11, Integrated Control Systems for Advanced Combined Cycles, Chu et al.

"39th GE Turbine State–of–the–Art Technology Seminar", Tab 12, Power Systems for the 21st Century H Gas Turbine Combined Cycles, Paul et al.

"39th GE Turbine State–of–the–Art Technology Seminar", Tab 13, Clean Coal and Heavy Oil Technologies for Gas Turbines, D. M. Todd.

"39th GE Turbine State–of–the–Art Technology Seminar", Tab 14, Gas Turbine Conversions, Modifications and Uprates Technology, Stuck et al.

"39th GE Turbine State–of–the–Art Technology Seminar", Tab 15, Performance and Reliability Improvements for Heavy–Duty Gas Turbines, J. R. Johnston.

"39th GE Turbine State–of–the–Art Technology Seminar", Tab 16, Gas Turbine Repair Technology, Crimi et al.

"39th GE Turbine State–of–the–Art Technology Seminar", Tab 17, Heavy Duty Turbine Operating & Maintenance Considerations, R. F. Hoeft.

"39th GE Turbine State–of–the–Art Technology Seminar", Tab 18, Gas Turbine Performance Monitoring and Testing, Schmitt et al.

"39th GE Turbine State–of–the–Art Technology Seminar", Tab 19, Monitoring Service Delivery System and Diagnostics, Madej et al.

"39th GE Turbine State–of–the–Art Technology Seminar", Tab 20, Steam Turbines for Large Power Applications, Reinker et al.

"39th GE Turbine State–of–the–Art Technology Seminar", Tab 21, Steam Turbines for Ultrasupercritical Power Plants, Retzlaff et al.

"39th GE Turbine State–of–the–Art Technology Seminar", Tab 22, Steam Turbine Sustained Efficiency, P. Schofield.

"39th GE Turbine State–of–the–Art Technology Seminar", Tab 23, Recent Advances in Steam Turbines for Industrial and Cogeneration Applications, Leger et al.

"39th GE Turbine State–of–the–Art Technology Seminar", Tab 24, Mechanical Drive Steam Turbines, D. R. Leger.

"39th GE Turbine State–of–the–Art Technology Seminar", Tab 25, Steam Turbines for STAG™ Combined–Cycle Power Systems, M. Boss.

"39th GE Turbine State–of–the–Art Technology Seminar", Tab 26, Cogeneration Application Considerations, Fisk et al.

"39th GE Turbine State–of–the–Art Technology Seminar", Tab 27, Performance and Economic Considerations of Repowering Steam Power Plants, Stoll et al.

"39th GE Turbine State–of–the–Art Technology Seminar", Tab 28, High–Power–Density™ Steam Turbine Design Evolution, J. H. Moore.

"39th GE Turbine State–of–the–Art Technology Seminar", Tab 29, Advances in Steam Path Technologies, Cofer, IV, et al.

"39th GE Turbine State–of–the–Art Technology Seminar", Tab 30, Upgradable Opportunities for Steam Turbines, D. R. Dreier, Jr.

"39th GE Turbine State–of–the–Art Technology Seminar", Tab 31, Uprate Options for Industrial Turbines, R. C. Beck.

"39th GE Turbine State–of–the–Art Technology Seminar", Tab 32, Thermal Performance Evaluation and Assessment of Steam Turbine Units, P. Albert.

"39th GE Turbine State–of–the–Art Technology Seminar", Tab 33, Advances in Welding Repair Technology J. F. Nolan.

"39th GE Turbine State–of–the–Art Technology Seminar", Tab 34, Operation and Maintenance Strategies to Enhance Plant Profitability, MacGillivray et al.

"39th GE Turbine State–of–the–Art Technology Seminar", Tab 35, Generator Insitu Inspections, D. Stanton.

"39th GE Turbine State–of–the–Art Technology Seminar", Tab 36, Generator Upgrade and Rewind, Halpern et al.

"39th GE Turbine State–of–the–Art Technology Seminar", Tab 37, GE Combined Cycle Product Line and Performance, Chase, et al.

"39th GE Turbine State–of–the–Art Technology Seminar", Tab 38, GE Combined Cycle Experience, Maslak et al.

"39th GE Turbine State–of–the–Art Technology Seminar", Tab 39 , Single–Shaft Combined Cycle Power Generation Systems, Tomlinson et al.

"Advanced Turbine System Program –Conceptual Design and Product Development", Annual Report, Sep. 1, 1994 – Aug. 31, 1995.

"Advanced Turbine Systems (ATS Program) Conceptual Design and Product Development", Final Technical Progress Report Vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems"Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced H Gas Turbine Technology", Press Information, Press Release, 96–NR14, Jun. 26, 1996, H Technology Tests/pp.1–4.

"Extensive Testing Program Validates High Efficiency, Reliability of GE's Advanced H Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's, Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–of–the–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development"Advanced Turbine Systems Annual Review Meeting Nov. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products"Gas Turbines, Brochure, 1998.

"MS7001H/MS9001H Gas Turbine, gepower.com website for PowerGen Europe"Jun.1–3 going public Jun. 15, (1995).

"New Steam Cooling System is a Key to 60% Efficiency For GE H Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$Century –H Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, Industrial Advanced Turbine Systems Program Overview, D. W. Esbeck, p. 3.

"Proceedings of the Advanced Turbine Systems Annual Program Review Meeting", vol. I, H Gas Turbine Combined Cycle, J. Corman, p.14.

"Proceedings of the Advanced Turbine Systems Annual Program Review Meeting", vol. I, Overview of Westinghouse's Advanced Turbine Systems Program, Bannister et al., p.22.

"Proceedings of the Advanced Turbine Systems Annual Program Review Meeting", vol. I, Allison Engine ATS Program Technical Review, D. Mukavetz, p. 31.

"Proceedings of the Advanced Turbine Systems Annual Program Review Meeting", vol. I, Advanced Turbine Systems Program Industrial System Concept Development, S. Gates, p. 43.

"Proceedings of the Advanced Turbine Systems Annual Program Review Meeting", vol. I, Advanced System Program Phase 2 Cycle Selection, Latcovich, Jr., p. 64.

"Proceedings of the Advanced Turbine Systems Annual Program Review Meeting", vol. I, General Electric ATS Program Technical Review Phase 2 Activities, Chance et al., p. 70.

"Proceedings of the Advanced Turbine Systems Annual Program Review Meeting", vol. I, Technical Review of Westinghouse's Advanced Turbine Systems Program, Diakunchak eta l., p.75.

"Proceedings of the Advanced Turbine Systems Annual Program Review Meeting", vol. I, Advanced Combustion Turbines and Cycles: An EPRI Perspective, Touchton et al., p.87.

"Proceedings of the Advanced Turbine Systems Annual Program Review Meeting", vol. I, Advanced Turbine Systems Annual Program Review, William E. Koop, p.89.

"Proceedings of the Advanced Turbine Systems Annual Program Review Meeting", vol. I, The AGTSR Consortium: An Update, Fant et al., p .93.

"Proceedings of the Advanced Turbine Systems Annual Program Review Meeting", vol. I, Overview of Allison /AGTSR Interactions, Sy A. Ali, p. 103.

"Proceedings of the Advanced Turbine Systems Annual Program Review Meeting", vol. I, Design Factors for Stable Lean Premix Combustion, Richards et al., p. 107.

"Proceedings of the Advanced Turbine Systems Annual Program Review Meeting", vol. I, Ceramic Stationary as Turbine, M. van Roode, p. 114.

"Proceedings of the Advanced Turbine Systems Annual Program Review Meeting", vol. I, DOE/Allison Ceramic Vane Effort, Wenglarz et al., p. 148.

"Proceedings of the Advanced Turbine Systems Annual Program Review Meeting", vol. I, Materials/Manufacturing Element of the Advanced Turbine Systems Program, Karnitz et al., p. 152.

"Proceedings of the Advanced Turbine Systems Annual Program Review Meeting", vol. I, Land–Based Turbine Casting Initiative, Mueller et al., p. 161.

"Proceedings of the Advanced Turbine Systems Annual Program Review Meeting", vol. I, Pratt & Whitney Thermal Barrier Coatings, Bornstein et al., p. 182.

"Proceedings of the Advanced Turbine Systems Annual Program Review Meeting", vol. I, Westinhouse Thermal Barrier Coatings, Goedjen et al., p. 194.

"Proceedings of the Advanced Turbine Systems Annual Program Review Meeting", vol. I, High Performance Steam Development, Duffy et al., p. 200.

"Proceedings of the Advanced Turbine Systems Annual Program Review Meeting", vol. II, Lean Premixed Combustion Stabilized by Radiation Feedback and heterogeneous Catalysis, Dibble et al., p. 221.

"Proceedings of the Advanced Turbine Systems Annual Program Review Meeting", vol. ll, Rayleigh/Raman/LIF Measurements in a Turbulent Lean Premixed Combustor, Nandula et al. p. 233.

"Proceedings of the Advanced Turbine Systems Annual Program Review Meeting", vol. II, Lean Premixed Flames for Low $No_X$ Combustors, Sojka et al., p. 249.

"Proceedings of the Advanced Turbine Systems Annual Program Review Meeting", vol. II, Functionally Gradient Materials for Thermal Barrier Coatings in Advanced Gas Turbine Systems, Banovic et al., p. 276.

"Proceedings of the Advanced Turbine Systems Annual Program Review Meeting", vol. II, Advanced Turbine Cooling, Heat Transfer, and Aerodynamic Studies, Han et al., p. 281.

"Proceedings of the Advanced Turbine Systems Annual Program Review Meeting", vol. II, Life Prediction of Advanced Materials for Gas Turbine Application, Zamrik et al., p. 310.

"Proceedings of the Advanced Turbine Systems Annual Program Review Meeting", vol. II, Advanced Combustion Technologies for Gas Turbine Power Plants, Vandsburger et al., p. 328.

"Proceedings of the Advanced Turbine Systems Annual Program Review Meeting", vol. II, Combustion Modeling in Advanced Gas Turbine Systems, Smoot et al., p. 353.

"Proceedings of the Advanced Turbine Systems Annual Program Review Meeting", vol. II, Heat Transfer in a Two–Pass Internally Ribbed Turbine Blade Coolant Channel with Cylindrical Vortex Generators, Hibbs et al. p. 371.

"Proceedings of the Advanced Turbine Systems Annual Program Review Meeting", vol. II, Rotational Effects on Turbine Blade Cooling, Govatzidakia et al., p. 391.

"Proceedings of the Advanced Turbine Systems Annual Program Review Meeting", vol. II, Manifold Methods for Methane Combustion, Yang et al., p. 393.

"Proceedings of the Advanced Turbine Systems Annual Program Review Meeting", vol. II, Advanced Multistage Turbine Blade Aerodynamics, Performance, Cooling, and Heat Transfer, Fleeter et al., p. 410.

"Proceedings of the Advanced Turbine Systems Annual Program Review Meeting", vol. II, The Role of Reactant Unmixedness, Strain Rate, and Length Scale on Premixed Combustor Performance, Samuelsen et al., p. 415.

"Proceedings of the Advanced Turbine Systems Annual Program Review Meeting", vol. II, Experimental and Computational Studies of Film Cooling With Compound Angle Injection, Goldstein et al., p. 423.

"Proceedings of the Advanced Turbine Systems Annual Program Review Meeting", vol. II, Compatibility of Gas Turbine Materials with Steam Cooling, Desai et al., p. 452.

"Proceedings of the Advanced Turbine Systems Annual Program Review Meeting", vol. II, Use of a Laser–Induced Fluorescence Thermal Imaging System for Film Cooling Heat Transfer Measurement, M. K. Chyu, p. 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, Steam as Turbine Blade Coolant: Experimental Data Generation, Wilmsen et al., p. 497.

"Proceedings of the Advanced Turbine Systems Annual Program Review Meeting", vol. II, Combustion Chemical Vapor Deposited Coatings for Thermal Barrier Coating Systems, Hampikian et al., p. 506.

"Proceedings of the Advanced Turbine Systems Annual Program Review Meeting", vol. II, Premixed Burner Experiments: Geometry, Mixing, and Flame Structure Issues, Gupta et al., p. 516.

"Proceedings of the Advanced Turbine Systems Annual Program Review Meeting", vol. II, Intercooler Flow Path for Gas Turbines: CFD Design and Experiments, Agrawal et al., p. 529.

"Proceedings of the Advanced Turbine Systems Annual Program Review Meeting", vol. II, Bond Strength and Stress Measurements in Thermal Barrier Coatings, Gell et al., p. 539.

"Proceedings of the Advanced Turbine Systems Annual Program Review Meeting", vol. II, Active Control of Combustion Instabilities in Loq $NO_x$ Gas Turbines, Zinn et al., p. 550.

"Proceedings of the Advanced Turbine Systems Annual Program Review Meeting", vol. II, Combustion Instability Modeling and Analysis, Santoro et al., p. 552.

"Proceedings of the Advanced Turbine Systems Annual Program Review Meeting", vol. II, Flow and Heat Transfer in Gas Turbine Disk Cavities Subject to Nonuniform External Pressure Field, Roy et al., p. 560.

"Proceedings of the Advanced Turbine Systems Annual Program Review Meeting", vol. II, Heat Pipe Turbine Vane Cooling, Langston et al., p. 566.

"Proceedings of the Advanced Turbine Systems Annual Program Review Meeting", vol. II, Improved Modeling Techniques for Turbomachinery Flow Fields, Lakshminarayana et al., p. 573.

"Proceedings of the Advanced Turbine Systems Annual Program Review Meeting", vol. II, Advanced 3D Inverse Method for Designing Turbomachine Blades, T. Dang, p. 582.

"Proceedings of the Advanced Turbine Systems Annual Program Review Meeting", ATS and the Industries of the Future, Denise Swink, p. 1.

"Proceedings of the Advanced Turbine Systems Annual Program Review Meeting", Gas Turbine Association Agenda, William H. Day, p. 3.

"Proceedings of the Advanced Turbine Systems Annual Program Review Meeting", Power Needs in the Chemical Industry, Keith Davidson, p. 17.

"Proceedings of the Advanced Turbine Systems Annual Program Review Meeting", Advanced Turbine Systems Program Overview, David Esbeck, p. 27.

"Proceedings of the Advanced Turbine Systems Annual Program Review Meeting", Westinghouse's Advanced Turbine Systems Program, Gerard McQuiggan, p. 35.

"Proceedings of the Advanced Turbine Systems Annual Program Review Meeting", Overview of GE's H Gas Turbine Combined Cycle, Cook et al., p. 49.

"Proceedings of the Advanced Turbine Systems Annual Program Review Meeting", Allison Advanced Simple Cycle Gas Turbine System, William D. Weisbrod, p. 73.

"Proceedings of the Advanced Turbine Systems Annual Program Review Meeting", The AGTSR Industry–University Consortium, Lawrence P. Golan, p. 95.

"Proceedings of the Advanced Turbine Systems Annual Program Review Meeting", $NO_x$ and CO Emissions Models for Gas–Fired Lean–Premixed Combustion Turbines, A. Mellor, p. 111.

"Proceedings of the Advanced Turbine Systems Annual Program Review Meeting", Methodologies for Active Mixing and Combustion Control, Uri Vandsburger, p. 123.

"Proceedings of the Advanced Turbine Systems Annual Program Review Meeting", Combustion Modeling in Advanced Gas Turbine Systems, Paul O. Hedman, p. 157.

"Proceedings of the Advanced Turbine Systems Annual Program Review Meeting", Manifold Methods for Methane Combustion, Stephen B. Pope, p. 181.

"Proceedings of the Advanced Turbine Systems Annual Program Review Meeting", The Role of Reactant Unmixedness, Strain Rate, and Length Scale on Premixed Combustor Performance, Scott Samuelsen, p. 189.

"Proceedings of the Advanced Turbine Systems Annual Program Review Meeting", Effect of Swirl and Momentum Distribution on Temperature Distribution in Premixed Flames, Ashwani K. Gupta, p. 211.

"Proceedings of the Advanced Turbine Systems Annual Program Review Meeting", Combustion Instability Studies Application to Land–Based Gas Turbine Combustors, Robert J. Santoro, p. 233.

"Proceedings of the Advanced Turbine Systems Annual Program Review Meeting", Active Control of Combustion Instabilities in Low $NO_X$ Turbines, Ben T. Zinn, p. 253.

"Proceedings of the Advanced Turbine Systems Annual Program Review Meeting", Life Prediction of Advanced Materials for Gas Turbine Application, Sam Y. Zamrik, p. 265.

"Proceedings of the Advanced Turbine Systems Annual Program Review Meeting", Combustion Chemical Vapor Deposited Coatings for Thermal Barrier Coating Systems, W. Brent Carter, p. 275.

"Proceedings of the Advanced Turbine Systems Annual Program Review Meeting", Compatibility of Gas Turbine Materials with Steam Cooling, Vimal Desai, p. 291.

"Proceedings of the Advanced Turbine Systems Annual Program Review Meeting", Bond Strength and Stress Measurements in Thermal Barrier Coatings, Maurice Gell, p. 315.

"Proceedings of the Advanced Turbine Systems Annual Program Review Meeting", Advanced Multistage Turbine Blade Aerodynamics, Performance, Cooling and Heat Transfer, Sanford Fleeter, P. 335.

"Proceedings of the Advanced Turbine Systems Annual Program Review Meeting", Flow Characteristics of an Intercooler System for Power Generating Gas Turbines, Ajay K. Agrawal, p. 357.

"Proceedings of the Advanced Turbine Systems Annual Program Review Meeting", Improved Modeling Techniques for Turbomachinery Flow Fields, B. Lakshiminarayana, p. 371.

"Proceedings of the Advanced Turbine Systems Annual Program Review Meeting", Development of an Advanced 3d & Viscous Aerodynamic Design Method for Turbomachine Components in Utility and Industrial Gas Turbine Applications, Thong Q. Dang, p. 393.

"Proceedings of the Advanced Turbine Systems Annual Program Review Meeting", Advanced Turbine Cooling, Heat Transfer and Aerodynami Studies, Je–Chin Han, p. 407.

"Proceedings of the Advanced Turbine Systems Annual Program Review Meeting", Heat Transfer in a Two–Pass Internally Ribbed Turbine Blade Coolant Channel with Vortex Generators, S. Acharya, p. 427.

"Proceedings of the Advanced Turbine Systems Annual Program Review Meeting", Experimental and Computational Studies of Film Cooling with Compound Angle Injection, R. Goldstein, p. 447.

"Proceedings of the Advanced Turbine Systems Annual Program Review Meeting", Study of Endwall Film Cooling with a Gap Leakage Using a Thermographic Phosphor Fluorescence Imaging System, Mingking K. Chyu, p. 461.

"Proceedings of the Advanced Turbine Systems Annual Program Review Meeting", Steam as a Turbine Blade Coolant: External Side Heat Transfer, Abraham Engeda, p. 471.

"Proceedings of the Advanced Turbine Systems Annual Program Review Meeting", Flow and Heat Transfer in Gas Turbine Disk Cavities Subject to Nonuniform External Pressure Field, Ramendra Roy, p. 483.

"Proceedings of the Advanced Turbine Systems Annual Program Review Meeting", Closed–Loop Mist/Steam Cooling for Advanced Turbine Systems, Ting Wang, p. 499.

"Proceedings of the Advanced Turbine Systems Annual Program Review Meeting", Heat Pipe Turbine Vane Cooling, Langston et al., p. 513.

"Proceedings of the Advanced Turbine Systems Annual Program Review Meeting", EPRI's Combustion Turbine Program: Status and Future Directions, Arthur Cohn, p. 535.

"Proceedings of the Advanced Turbine Systems Annual Program Review Meeting", ATS Materials Support, Michael Karnitz, p. 553.

"Proceedings of the Advanced Turbine Systems Annual Program Review Meeting", Land Based Turbine Casting Initiative, Boyd A. Mueller, p. 577.

"Proceedings of the Advanced Turbine Systems Annual Program Review Meeting", Turbine Airfoil Manufacturing Technology, Charles S. Kortovich, p. 593.

"Proceedings of the Advanced Turbine Systems Annual Program Review Meeting", Hot Corrosion Testing of TBS's, Norman Bornstein, p. 623.

"Proceedings of the Advanced Turbine Systems Annual Program Review Meeting", Ceramic Stationary Gas Turbine, Mark van Roode, p. 633.

"Proceedings of the Advanced Turbine Systems Annual Program Review Meeting", Western European Status of Ceramic for Gas Turbines, Tibor Bornemisza, p. 659.

"Proceedings of the Advanced Turbine Systems Annual Program Review Meeting", Status of Ceramic Gas Turbines in Russia, Mark van Roode, p. 671.

"Status Report: The U.S. Department of Energy's Advanced Turbine systems Program", facsimile dated Nov. 7, 1996.

"Testing Program Results Validate GE's H Gas Turbine – High Efficiency, Low Cost of Electricity and Low Emissions", Roger Schonewald and Patrick Marolda,.

"Testing Program Results Validate GE's H Gas Turbine – High Efficiency, Low Cost of Electricity and Low Emissions", Slide Presentation –working draft.

"The Next Step In H...For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Numbers: DOE/31176–10.

"Utility Advanced Turbine System (ATS) Technology Readiness Testing and Pre–Commercial Demonstration, Phase 3", Document #486029, Oct. 1 –Dec. 31, 1995, Publication Date, May 1, Report Numbers: DOE/MC/31176—5340.

"Utility Advanced Turbine System (ATS) Technology Readiness Testing and Pre–Commercial Demonstration – Phase 3", Document #486132, Apr. 1 –Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration — Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration"Document #666277, Apr. 1 –Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration"Jan. 1 –Mar. 31, 1996, DOE/MC/31176–5338.

"Utility Advanced Turbine System (ATS) Technology Readiness Testing: Phase 3R", Document #756552, Apr. 1 – Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Documents #1348, Apr. 1 –Jun. 29, 1998 Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

REUSABLE PIPE FLANGE COVERS

This invention was made with Government support under Contract No. DE-FC21-95MC31176 awarded by the Department of Energy. The Government has certain rights in this invention.

BACKGROUND OF THE INVENTION

This invention relates to power plant construction and, specifically, to a unique and reusable pipe flange cover that protects pipe flanges from damage and prevents debris from entering the pipe openings, primarily during storage and shipment and prior to installation in the plant.

Construction of a power plant involves the manufacture and assembly of many and various styles and sizes of flanged pipe assemblies. A major requirement in the manufacture and installation of these flanged pipe assemblies is that they are clean and free of foreign debris between the time they are manufactured and the time they are installed. Existing flange cover designs fall into two categories:

a. Metal flange covers with rubber gaskets held in place by the use of nuts and bolts. These covers protect the flange face, seal the pipe opening, and make use of the bolt holes in the flange to secure the cover in place. This configuration, however, requires tools to install and involves a cumbersome procedure. Due to the weight of the flange and the requirement to use nuts and bolts to secure the cover to the flange, it is often either not properly installed, or not properly re-installed when taken off for any reason.

b. Plastic covers of various configurations. The plastic covers do an adequate job of protecting the flange face but do not adequately seal the pipe opening. The plastic tends to warp when exposed to sunlight or extreme temperature variations. The majority of this type of flange cover do not have positive retention methods, and therefore they tend to come off during use.

BRIEF SUMMARY OF THE INVENTION

This invention relates to a molded but flexible cover that completely encompasses the pipe flange and is secured by tightening a drawstring on the backside of the flange. The flange cover may include a rubber core covered on both sides with a wear cover. The cover may include high impact fabric such as Kevlar®, a thin layer of rubber and a wear resistant fabric, the latter on the outside. In addition, at the interface of the flat cover and depending skirt, a stainless insert may be added. A surrounding or depending skirt portion includes tapered tabs that are loosely connected by a drawstring can be tightened to thereby pull the tabs together about the back side of the flange. Tying the drawstring ends keeps the cover securely in place.

The cover protects the flange from damage, and also prevents foreign objects from entering the pipe opening. Significantly, the cover is reusable and no tooling is required for installation or removal.

Thus, in its broader aspects, the invention relates to a pipe flange cover for temporarily covering a pipe flange and pipe opening, the cover comprising a substantially round center portion having a peripheral skirt portion depending from the center portion, the center portion adapted to engage a front side of the pipe flange and to seal the pipe opening, the peripheral skirt portion formed to include a plurality of circumferentially spaced tabs, wherein free ends of the tabs are formed with respective through passages adapted to receive a drawstring for pulling said tabs together on a back side of the pipe flange.

In another aspect, the invention relates to a pipe flange cover for temporarily covering a pipe flange and pipe opening, the cover comprising a substantially round center portion having a peripheral skirt portion depending from the center portion, the center portion adapted to engage a front side of the pipe flange and to seal the pipe opening, the peripheral skirt portion formed to include a plurality of circumferentially spaced tabs, wherein free ends of the tabs are formed with respective through passages adapted to receive a drawstring for pulling the tabs together on a back side of the pipe flange, wherein the cover is comprised of a rubber core sandwiched about a high impact fabric, and further wherein the rubber core is covered on inner and outer surfaces, respectively, by at least one layer of wear resistant fabric.

DETAILED DESCRIPTION OF THE INVENTION

Figure 1:
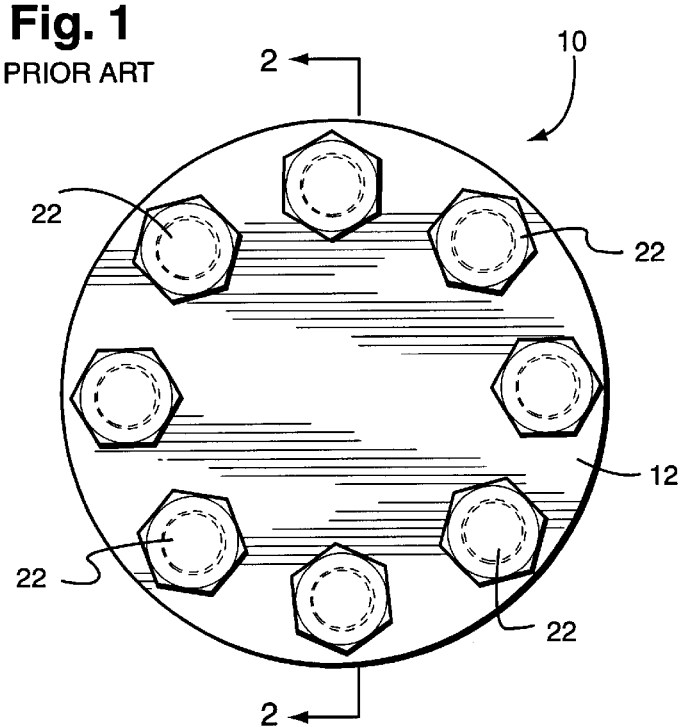
FIG. 1 is a plan view of the known pipe flange cover.
Figure 2:
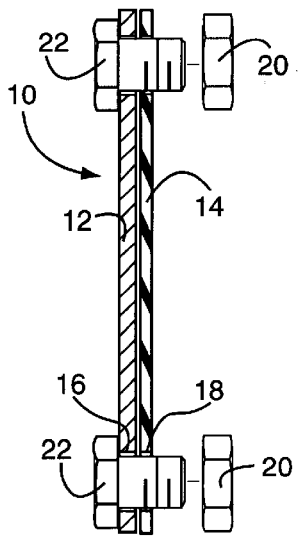
FIG. 2 is a side section of the cover shown in FIG. 1.

FIGS. 1 and 2 illustrate a known pipe flange cover 10 that includes a round plate 12 and an underlying, similarly sized rubber gasket 14. Both components 12 and 14 have a plurality of alignable bolt holes 16, 18, respectively, formed therein for accommodating a plurality of nuts and bolts 20, 22, respectively, that are used to secure the cover 10 the pipe flange (not shown). The bolts 22 pass through holes 16 and 18 as well as the bolt holes in the pipe flange, and are secured with the nuts 20 that are tightened from the underside of the flange.

Figure 3:
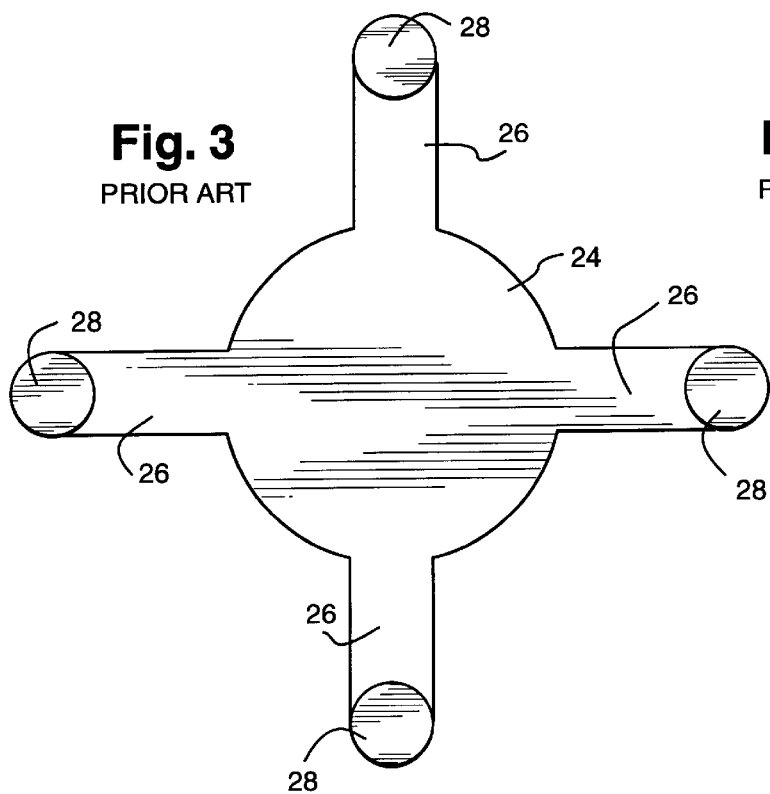
FIG. 3 is a plan view of another known pipe flange cover.
Figure 4:
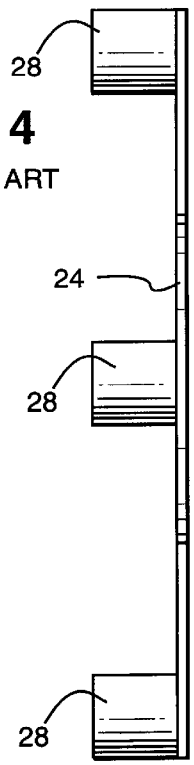
FIG. 4 is a side elevation of FIG. 3.

FIGS. 3 and 4 illustrate another known pipe flange cover that includes a center panel 24 adapted to seal a pipe opening, and a plurality of radial spokes 26, each having a smooth cylindrical "plug" 28 at the radially outermost end thereof. The plugs 28 extend perpendicularly from the spokes 26 and are adapted to seat in the pipe flange bolt holes, holding the cover panel 24 against the pipes flange assembly by friction.

Figure 5:
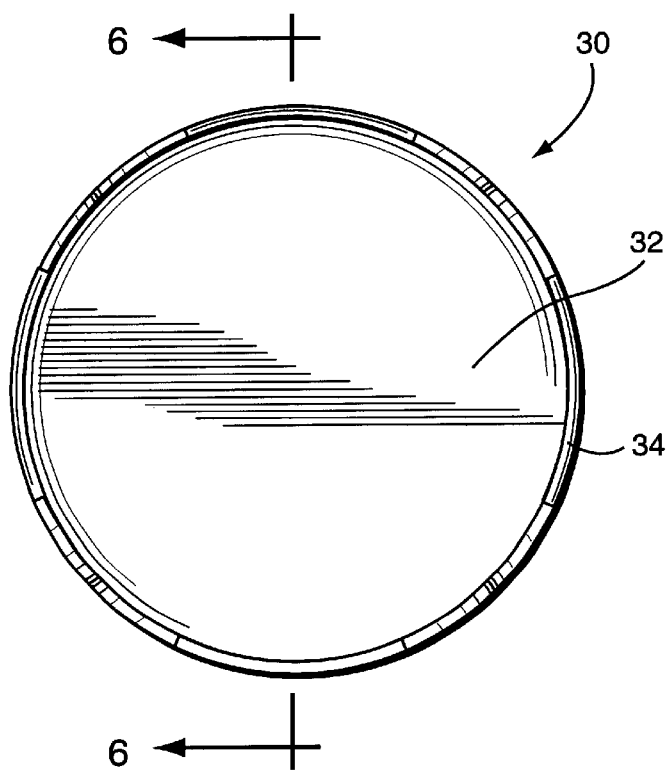
FIG. 5 is a bottom plan view of the cover in accordance with the invention.
Figure 6:
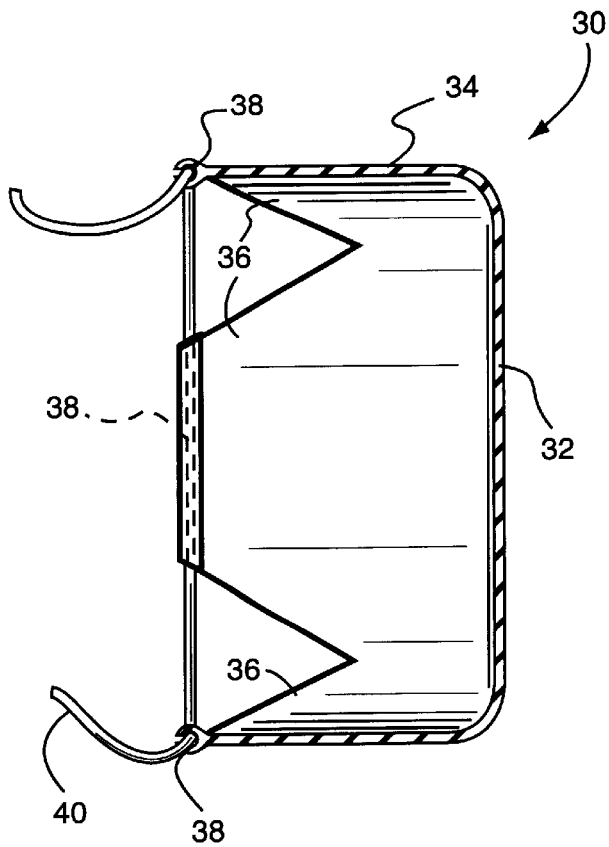
FIG. 6 is a substantial view of the cover shown in FIG. 5.
Figure 7:
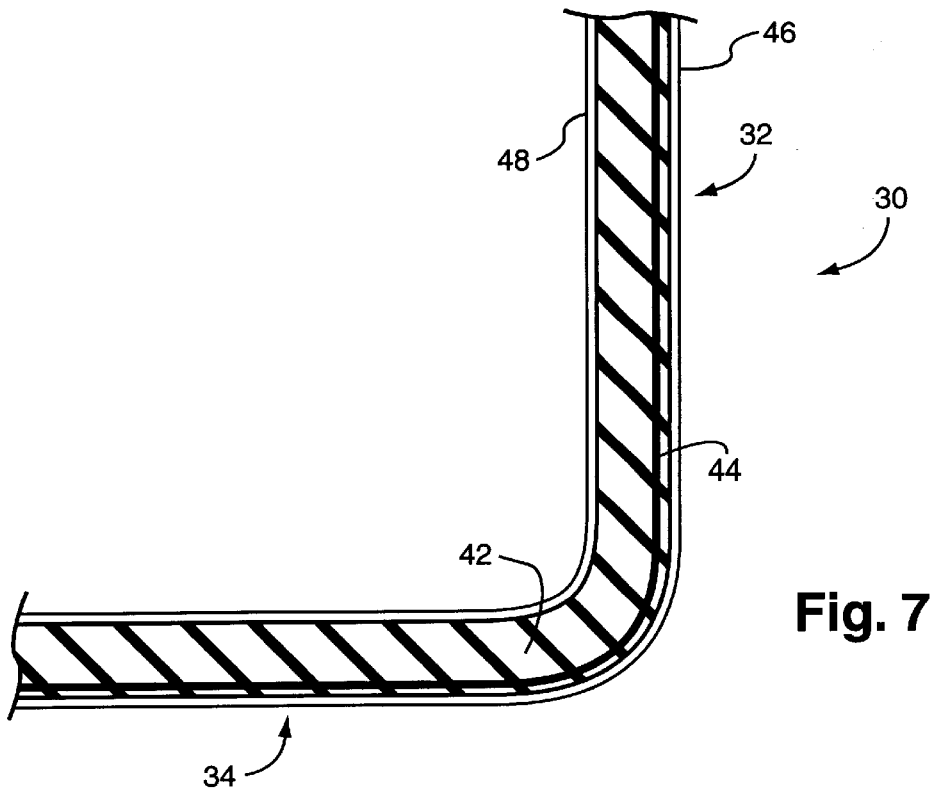
FIG. 7 is an enlarged detailed takes from FIG. 6.

Turning now to FIGS. 5–7, a molded, flexible pipe flange cover 30 in accordance with this invention includes a round center portion 32 and a depending skirt portion 34. The lowermost portion of the depending skirt is cut to form a plurality (four shown) of tapered, flexible tabs 36, equally spaced about the skirt. In other words, the tabs 36 have an axial length dimension less than the axial length of the skirt portion. Free ends of the tabs are truncated and formed with internal passages 38 that are adapted to receive a drawstring 40 laced through the passages. After the cover is placed over the pipe flange, the drawstring 40 may be pulled tightly so that the tapered tabs 36 are pulled down over the back side of the flange and then tied to hold the tabs in position. The tabs now form a near solid surface, providing coverage and protection for both sides of the flange, while also preventing debris from entering the pipe opening.

With reference to FIG. 7, the pipe flange cover is formed with a rubber core 42 sandwiched around a fabric layer 44 of high impact resistance. Both sides of the core are covered with thin layer of wear resistant fabric 46, 48, respectively.

Figure 8:
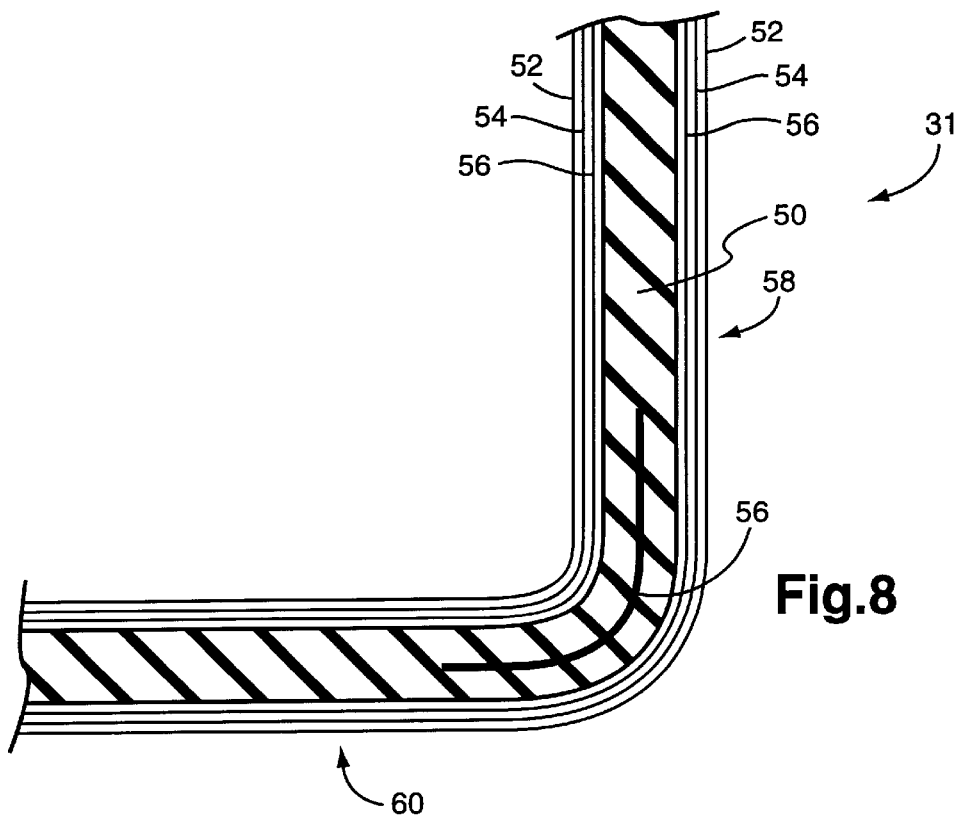
FIG. 8 is an enlarged detail similar to FIG. 7 in accordance with an alternative embodiment of the invention.

FIG. 8 shows an alternative cover 31 where a rubber core 50 is covered on both sides with thin layers or plies of wear fabric 52, rubber 54 and high impact resistant fabric 56. In addition, a stainless insert 56 is embedded within the cross-section at the intersection of the center portion 58 and depending skirt portion 60.

The advantages of a pipe flange cover as described above are that it is reusable; it has a minimum number of parts; it has a positive retention feature; it protects the pipe flange and seals pipe opening; and it requires no tooling for installation and/or removal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pipe flange cover for temporarily covering a pipe flange and pipe opening, said cover comprising a core including a substantially flat, round center portion having a peripheral skirt portion depending from said center portion, an insert embedded in said core at least partially in said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange.

2. A pipe flange cover for temporarily covering a pipe flange and pipe opening, said cover comprising a substantially round center portion having a peripheral skirt portion depending from said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange; wherein said tabs are tapered inwardly in a direction extending away from said center portion.

3. The pipe flange cover of claim 2 wherein said tabs have length dimensions less than an axial length dimension of said depending skirt portion.

4. A pipe flange cover for temporarily covering a pipe flange and pipe opening, said cover comprising a substantially round center portion having a peripheral skirt portion depending from said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange; wherein said cover is comprised of a rubber core, and wherein a metal insert is embedded at an intersection of said center portion and said peripheral skirt portion.

5. The pipe flange cover of claim 4 wherein said rubber core is covered on inner and outer surfaces thereof by plies of wear resistant fabric, rubber and high impact fabric.

6. A pipe flange cover for temporarily covering a pipe flange and pipe opening, said cover comprising a substantially round center portion having a peripheral skirt portion depending from said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange; wherein said cover is comprised of a rubber core sandwiched about a high impact fabric.

7. A pipe flange cover for temporarily covering a pipe flange and pipe opening, said cover comprising a substantially round center portion having a peripheral skirt portion depending from said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange, wherein said cover is comprised of a rubber core sandwiched about a high impact fabric, and further wherein said rubber core is covered on inner and outer surfaces, respectively, by layers of wear resistant fabric.

8. The pipe flange cover of claim 7 wherein said tabs are tapered inwardly in a direction extending away from said center portion.

9. The pipe flange cover of claim 8 wherein said tabs have length dimensions less than an axial length dimension of said depending skirt portion.

10. A pipe flange cover for temporarily covering a pipe flange and pipe opening, said cover comprising a substantially round center portion having a peripheral skirt portion depending from said center portion, said center portion adapted to engage a front side of the pipe flange and to seal the pipe opening, said peripheral skirt portion formed to include a plurality of circumferentially spaced tabs, wherein free ends of said tabs are formed with respective through passages adapted to receive a drawstring for pulling said tabs together on a back side of the pipe flange, and wherein said cover is comprised of a rubber core covered on inner and outer surfaces, respectively, by layers of wear resistant fabric.

\* \* \* \* \*